(12) United States Patent
Powell et al.

(10) Patent No.: US 7,583,799 B2
(45) Date of Patent: Sep. 1, 2009

(54) INTERNET PROTOCOL TELEPHONE MOUNTING APPARATUS

(75) Inventors: Stephen Forrest Powell, San Antonio, TX (US); Gregory Edward Berger, San Antonio, TX (US); Nicholas Gibson Burgett, San Antonio, TX (US); Michael Edward Searcy, Schertz, TX (US)

(73) Assignee: Arminius Select Services Corporation, San Antonio, TX (US)

( * ) Notice: Subject to any disclaimer, the term of this patent is extended or adjusted under 35 U.S.C. 154(b) by 550 days.

(21) Appl. No.: 11/260,969

(22) Filed: Oct. 28, 2005

(65) Prior Publication Data

US 2007/0116265 A1   May 24, 2007

(51) Int. Cl.
*H04M 1/00* (2006.01)
(52) U.S. Cl. ........................ 379/454; 379/446
(58) Field of Classification Search ................ 379/443, 379/446, 447, 454, 455
See application file for complete search history.

(56) References Cited

U.S. PATENT DOCUMENTS 4,152,874 A * 5/1979 Ertl .............................. 52/27
4,602,755 A * 7/1986 Rosten ....................... 248/214

* cited by examiner

*Primary Examiner*—Tuan D Nguyen
(74) *Attorney, Agent, or Firm*—Jackson Walker LLP; William B. Nash

(57) ABSTRACT

The present invention provides a telephone mounting apparatus comprising a mounting bracket having one or more mounting members shaped to engage the rear portion of a telephone. The mounting bracket of the present invention provides mounting sleeves having a hollow cylindrical bore for receiving screw members. Such sleeves may be utilized to releasably attach the mounting bracket of the present invention directly to a mounting surface and/or a conventional telephone mounting box. The mounting member of the present invention provides walls defining at least one cavity through which phone cables may be inserted. In one embodiment, the cavity of the present invention has a generally rectangular configuration and is positioned upon the mounting bracket so as to be adjacent to one or more attachment ports of the telephone. The relative positioning of the cavity allows cables to be connected and/or disconnected in a convenient manner.

20 Claims, 3 Drawing Sheets

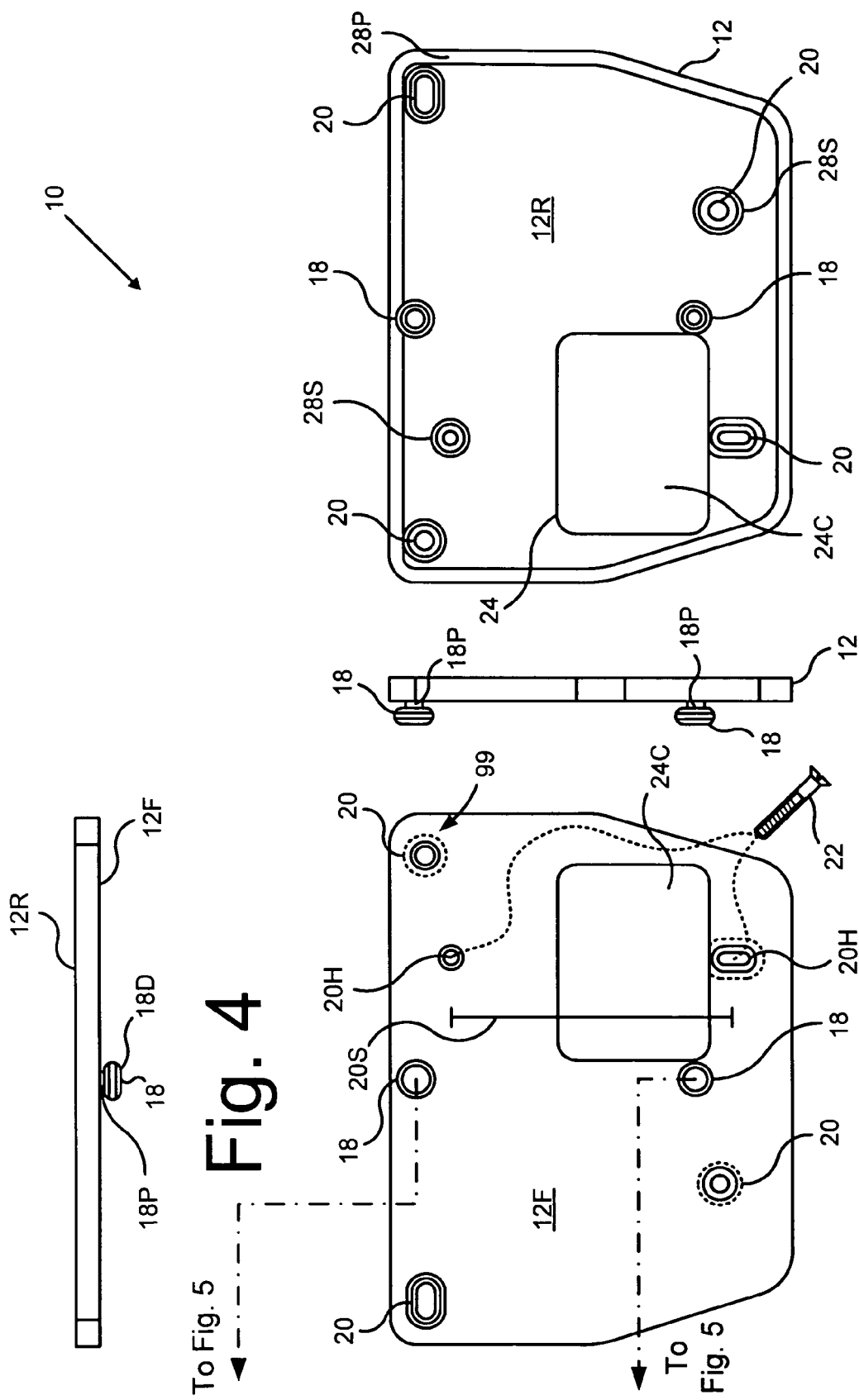

INTERNET PROTOCOL TELEPHONE MOUNTING APPARATUS

FIELD OF THE INVENTION

The present invention relates generally to mounting brackets and, more particularly, to a mounting bracket for mounting an Internet Protocol (IP) telephone to a mounting surface.

BACKGROUND OF THE INVENTION

For a century, conventional telephone systems have been utilized to make telephone calls. When a conventional telephone call is made, a circuit opens between the two parties. No matter how long the parties speak, or whether there are quiet periods in the conversation, the circuit remains open. The greater the distance between the parties, the greater the cost because telephone companies must lease a longer telephone line for that call to take place.

Voice over Internet Protocol, commonly called Voice over IP or VOIP, utilizes the Internet to deliver voice communications. A VOIP phone converts audio information into "packets" and transmits those packets using the same technology that a computer uses to download web pages and e-mail. Basically, a VOIP phone is an Internet computer that looks and behaves like a very powerful phone.

Although the use of VOIP phones is becoming more prevalent, there remains a need for a convenient and effective method of mounting such telephones to a variety of mounting surfaces.

SUMMARY OF THE INVENTION

Accordingly, the present invention provides a telephone mounting apparatus comprising a mounting bracket or plate having a front surface containing at least one mounting member or peg. In one embodiment, the mounting members of the present invention extend outwardly from the front surface of the mounting bracket and are shaped to engage the rear portion of a telephone to be releasably mounted thereto.

The mounting bracket of the present invention provides at least one hollow cylindrical bore mounting sleeve for receiving a mounting fastener or screw. Such sleeves may be utilized to releasably attach the mounting bracket of the present invention directly to a mounting surface such as a wall and/or a conventional electrical box.

The mounting bracket of the present invention provides walls defining at least one cavity through which phone hookups may be passed. In one embodiment, such a cavity has a generally rectangular configuration and is positioned so as to be adjacent to one or more attachment ports of the telephone to be mounted. For example, if the user wishes to mount an IP telephone, he or she will be required to connect data and power cables to the instrument in order to facilitate its operation. The relative positioning of the cavity provided by the present invention allows such operation cables to be connected and/or disconnected in a convenient manner.

In one embodiment, the mounting pegs or lugs of the present invention are removable from the mounting bracket. In this embodiment, threaded proximate ends of each removable mounting peg are designed for insertion into mounting member sleeves provided in the mounting bracket. Each mounting member sleeve is selectively positioned upon the front surface of the mounting bracket so as to align with OEM shelves or mounting receptacles provided upon the rear portion of the telephone.

The distal end of each removable mounting peg may be shaped and sized to engage mounting receptacles provided by a wide variety of telephones. Thus, the user may insert mounting members selected from a variety of styles into corresponding mounting member sleeves provided upon the front surface of the mounting bracket to accommodate mounting of any number of particular telephones. This feature of the present invention allows the user to adapt the mounting bracket to accommodate a plurality of telephone designs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a front, elevation view of the mounting bracket of one embodiment of the present invention.

FIG. 2 is a rear, elevation view of the mounting bracket of the embodiment of FIG. 1.

FIG. 3 is a right side, elevation view of the mounting bracket of the FIG. 1 embodiment of the present invention.

FIG. 4 is a top plan view of the mounting bracket of one embodiment of the present invention.

DETAILED DESCRIPTION OF THE INVENTION

Figure 5:
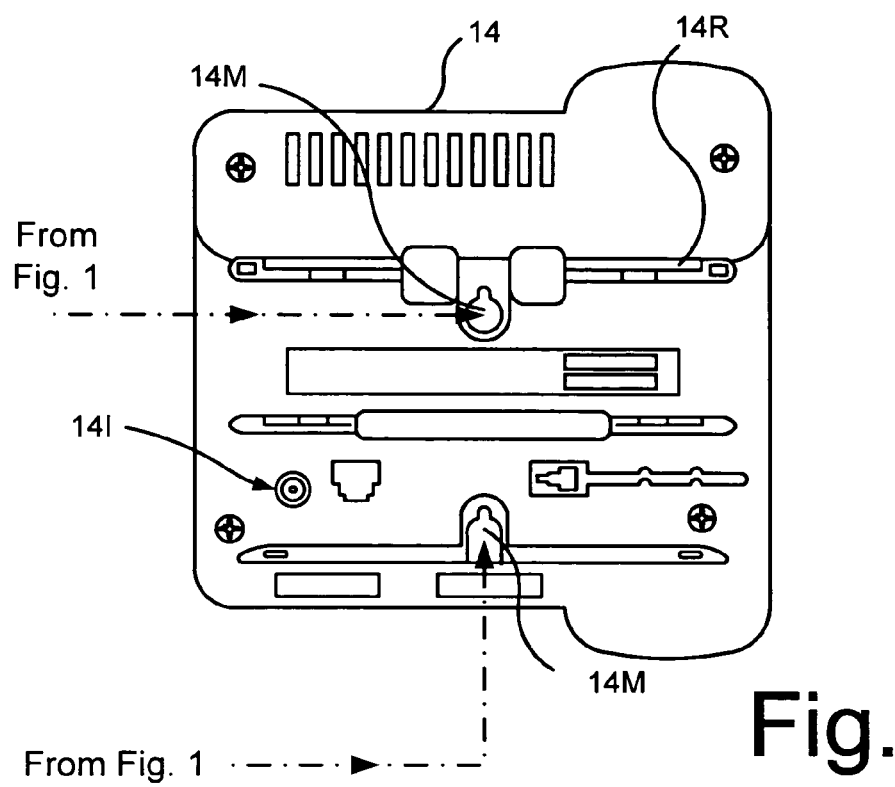
FIG. 5 is an elevation view of the rear portion of a prior art IP telephone.
Figure 6:
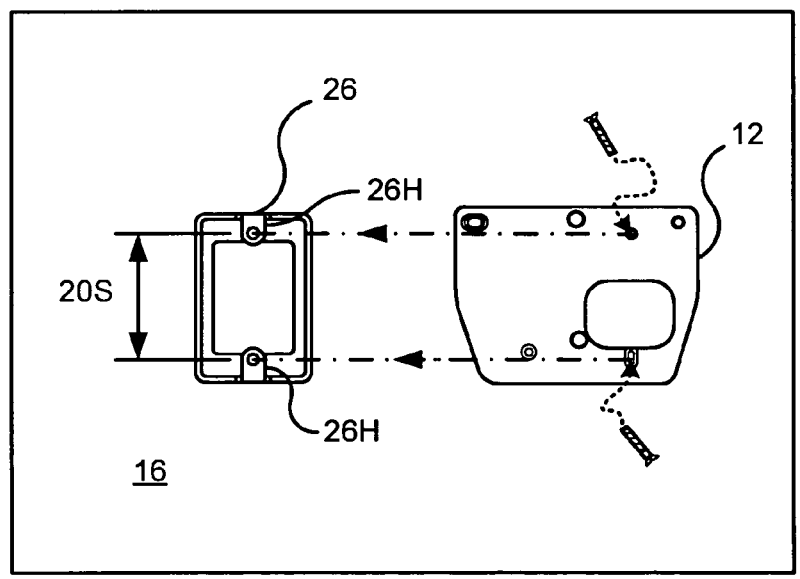
FIG. 6 is an exploded view illustrating the attachment of one embodiment of the present invention mounting bracket to a conventional phone box on a wall.
Figure 7:
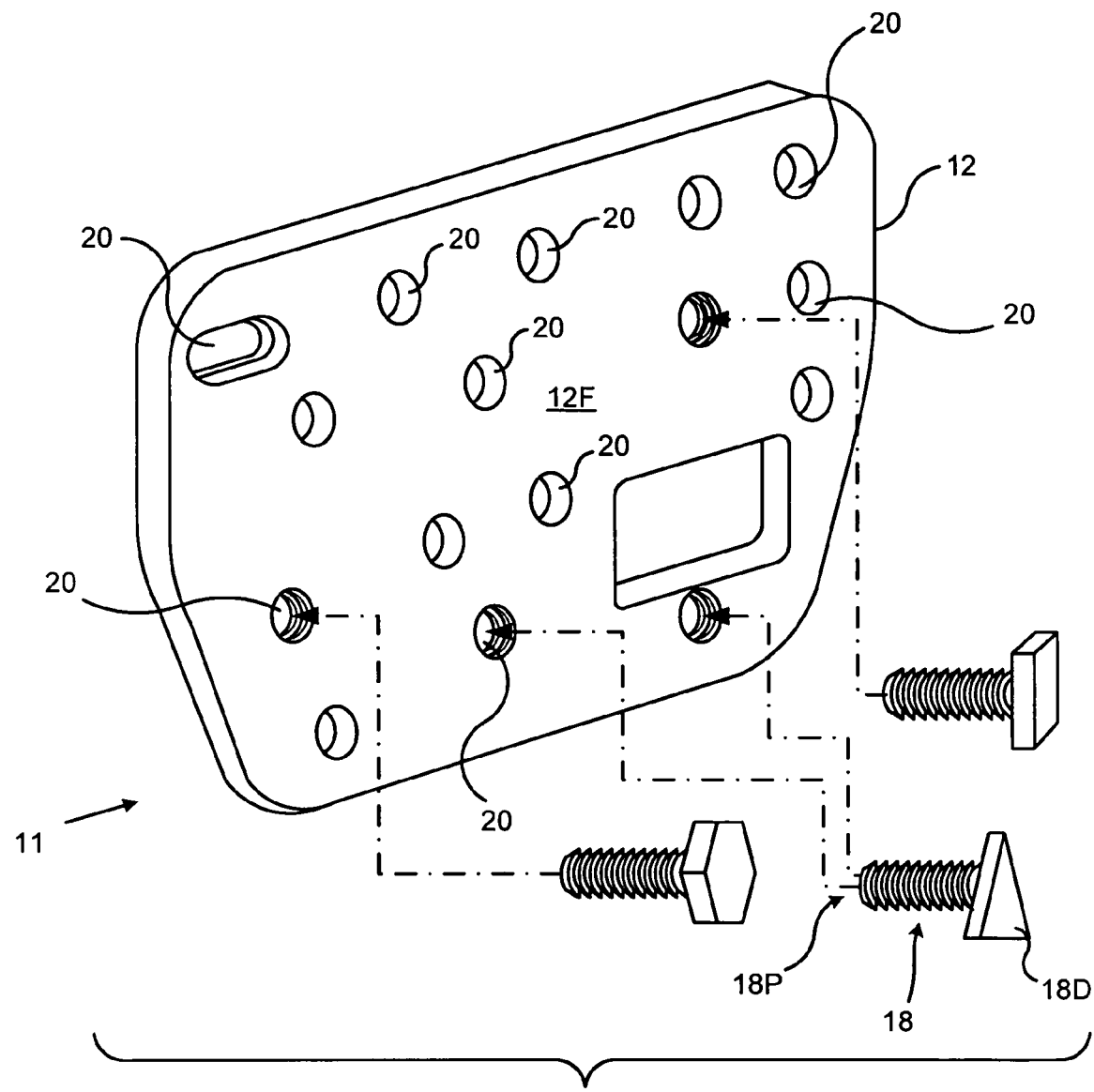
FIG. 7 is a perspective view of the telephone mounting kit of one embodiment of the present invention.

The present invention is herein described as a telephone mounting apparatus (10) and as a telephone mounting kit (11) (FIG. 7). Referring to FIGS. 1-6, the present invention comprises a mounting bracket (12) having a front surface or face (12F) and a rear surface or face (12R) for engaging a mounting surface (16) or wall (FIG. 6). The mounting bracket of the present invention may be composed of any suitable material as would be apparent to one of ordinary skill in the art. In one embodiment, the mounting bracket of the present invention is composed of molded plastic.

In one embodiment, the mounting bracket (12) of the present invention is designed to releasably attach to a wall or other mounting surface (16) already provided with a conventional electrical box (26). In this manner, the mounting bracket of the present invention allows for the quick and convenient upgrade from a conventional telephone arrangement to an IP telephone arrangement, as discussed further below.

The mounting bracket (12) is equipped with at least one IP telephone mounting member or peg (18) In one embodiment, the mounting members of the present invention extend outwardly from the front surface (12F) of the mounting bracket (12) and are shaped to engage the rear portion (14R) of a telephone (14). It being understood that the mounting members (18) may be shaped and/or sized to accommodate any number of telephones (14) as well as any number of mounting surfaces (16).

As may be seen in FIGS. 3 and 4, each mounting member (18) of the present invention has a proximate end (18P) for releasably attaching to the front surface (12F) of the mounting bracket (12) and a distal end (18D) spaced apart from the front surface and shaped to engage a rear portion (14R) of a telephone (14). In one embodiment, the distal end of the mounting members have a rounded, generally circular configuration similar to a thick button to facilitate engagement with OEM shelves or mounting receptacles (14M) provided upon a rear portion of the telephone.

The mounting bracket (12) of the present invention provides at least one mounting orifice or sleeve (20) having a hollow cylindrical bore (20H) for receiving a screw member (22). Such orifices or sleeves may be utilized to releasably attach the mounting bracket (12) directly to a mounting surface (16), whether or not a conventional phone box (26) is present.

In one embodiment, the present invention provides mounting sleeves (20) capable of mounting the bracket of the present invention to a wall and/or conventional phone box, as directed by the user. A plurality of mounting sleeves, in any number of sizes, may be provided by the present invention for this purpose. Further, mounting sleeves may be positioned upon the mounting bracket in any number of configurations. In one embodiment, at least one mounting sleeve is positioned proximately to a corner (99) of the mounting bracket. This feature of the present invention allows the mounting bracket to be securely attached to a mounting surface.

The present invention provides edges (24) defining at least one cavity (24C) through which phone hookups may be inserted. In one embodiment, the cavity (24C) of the present invention has a generally rectangular configuration and is positioned within the mounting bracket so as to align and cooperate with one or more phone jack attachment ports (14I) of the telephone. For example, if the user wishes to mount an IP telephone, he or she will be required to connect external data wiring and power cables to port (14I) in order to facilitate its operation. The relative positioning of the cavity (24C) of the present invention allows such cables pass through the bracket (12) to be connected and/or disconnected in a convenient manner.

In one embodiment, the present invention provides two mounting orifices (20H) having a relative spacing (20S) therebetween to facilitate screw insertion through each orifice and into screw holes (26H) provided in a conventional phone receptacle box (26) (FIG. 6). Such mounting orifices may be positioned upon the mounting bracket (12) adjacent to the cavity (24C) and, in particular, above and below the cavity. This feature of the present invention allows the mounting bracket to mount to any conventional phone receptacle box (26) while also allowing for the efficient hook up of telephone data and power cables through the cavity (24C).

The mounting bracket of the present invention is designed to flush mount to a wall or other linear mounting surface. To facilitate flush mounting, each mounting sleeve of the present invention may be equipped with a raised lip or edge (28S) extending outwardly from the rear surface (12R) of the mounting bracket (12). Further, the entire periphery of the mounting bracket may also be equipped with a raised surface or lip (28P) extending outwardly from the rear surface of the mounting bracket. In one embodiment, each raised surface (28S and 28P, respectively) extends about ⅜ of an inch from the rear surface (12R) of the mounting bracket. to ensure even mounting upon linear surfaces.

Referring to FIG. 7, in one embodiment, the mounting members or pegs (18) of the present invention are removable from the mounting bracket and may be provided to the user along with the mounting bracket in the form of a mounting kit (11). In this embodiment, the proximate ends (18P) of each mounting peg (18) are designed to be inserted into mounting member orifices (20) positioned upon the front surface (12F) of the mounting bracket (12). As may be seen in FIG. 7, a plurality of orifices (20) may be provided in the bracket to accommodate the variety of configurations of the rear surfaces (14R) of the IP phones. Each mounting member sleeve may be selectively positioned upon the front surface of the mounting bracket so as to align with OEM shelves or mounting receptacles (14M) provided upon the rear portion (14R) of the telephone (14) to be mounted.

The distal end (18D) of each mounting member may be shaped and sized to engage the mounting receptacles (14M) provided upon the rear portion (14R) of any number of telephones to be mounted. In this embodiment, the user may insert selected mounting members into corresponding mounting member sleeves provided upon the rear surface of the mounting bracket to accommodate efficient and convenient telephone mounting. This feature of the present invention allows the user to adapt the mounting bracket to accommodate a plurality of telephone designs.

In this embodiment, the user simply picks which mounting member to attach to the mounting bracket and inserts it into the mounting bracket using the appropriate mounting member orifice or sleeve. Once secured, the distal end of the mounting member(s) may be inserted into the mounting receptacle provided upon the rear portion of the telephone. Any number of ways may be utilized to attach the pegs (18) to the bracket (12) such as interference fit, adhesive, sonic welding, threads, and the like.

The mounting member sleeves and mounting members may also be color coded to assist the user in selecting the appropriate sleeve and mounting member for use in mounting a particular phone. Further, portions of the mounting member sleeves and mounting members may be threaded to allow the user to simply screw the mounting member into the appropriate mounting member sleeve. It should be understood that the mounting members of the present invention may be used independently from, or in conjunction with, conventional screws, and that conventional screws may also be provided to the user in the mounting kit.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A telephone mounting apparatus for use with a telephone having external communication wiring and attachment ports comprising:
  a mounting bracket having a front surface for engaging a rear portion of said telephone and a rear surface for engaging a mounting surface;
  at least one mounting member extending outwardly from said front surface of said bracket, said mounting member having a proximate end attached to said bracket front surface and a distal end spaced apart from said bracket front surface for engaging a rear portion of said telephone;
  at least one mounting sleeve having a hollow cylindrical portion for receiving a fastener; and
  at least one cavity in said bracket for allowing said communication wiring to pass therethrough,
  wherein said proximate end of said mounting member is arranged inside said mounting sleeve.

2. The apparatus of claim 1, wherein said mounting bracket comprises at least two mounting sleeves, said mounting sleeves being spaced apart to facilitate fastener insertion therethrough and into attachment holes provided by a conventional phone receptacle box.

3. The apparatus of claim 1, wherein at least one of said mounting sleeves is adjacent to said cavity.

4. The apparatus of claim 1, wherein said mounting sleeves extend outwardly from said front surface of said mounting bracket.

5. The apparatus of claim 1, wherein at least one of said mounting sleeves is mounted proximately to a corner of said mounting bracket.

6. The apparatus of claim 1, wherein said cavity has a generally rectangular configuration.

7. The apparatus of claim 1, wherein said cavity is adjacent to one or more said attachment ports of said telephone upon mounting of said telephone to said bracket.

8. The apparatus of claim 1, wherein said mounting bracket is composed of molded plastic.

9. The apparatus of claim 1, wherein said rear surface of said mounting bracket comprises at least one raised surface to facilitate even mounting of said bracket to said mounting surface.

10. The apparatus of claim 1, wherein said distal end of said mounting member has a generally circular configuration.

11. The apparatus of claim 1, wherein said mounting member is removably attached to said mounting bracket.

12. The apparatus of claim 1, wherein said mounting surface comprises a wall.

13. The apparatus of claim 1, wherein said mounting surface comprises a telephone box.

14. A telephone mounting apparatus for use with a telephone having external communication wiring and attachment ports comprising:
 a mounting bracket having a front surface for engaging a rear portion of said telephone and a rear surface for engaging a mounting surface;
 at least two mounting members extending outwardly from said front surface of said bracket, said mounting member having a proximate end releasably attached to said bracket front surface and a distal end spaced apart from said bracket front surface for engaging a rear portion of said telephone, said distal end of said mounting members being shaped to engage mounting receptacles upon a rear portion of said telephone;
 a plurality of mounting sleeves having a hollow cylindrical portion for receiving a fastener; at least two of said mounting sleeves being spaced apart to facilitate fastener insertion therethrough and into attachment holes provided by a conventional phone receptacle box; and
 walls defining at least one cavity having a generally rectangular configuration, said cavity located adjacent to one or more attachment ports of said telephone upon mounting of said telephone to said bracket.

15. A telephone mounting kit comprising: a mounting bracket comprising a plurality of mounting sleeves, said sleeves being selectively positioned upon said mounting bracket so as to align with one or more telephone mounting receptacles; and a plurality of mounting members, each having a proximate end sized for insertion into at least one of said mounting member sleeves and a distal end sized to releasably engage at least one of said telephone mounting receptacles; wherein proximate end of said mounting member is arranged inside said mounting sleeve and wherein said mounting bracket is adapted to allow communication wiring to pass from a telephone to a mounting surface.

16. The telephone mounting kit of claim 15, wherein said mounting sleeves and said mounting members are color coded.

17. The telephone mounting kit of claim 15, wherein at least a portion of said mounting sleeves are threaded.

18. The telephone mounting kit of claim 17, wherein at least a portion of said mounting members are threaded.

19. The telephone mounting kit of claim 15, wherein said mounting bracket further comprises walls defining a cavity.

20. The telephone mounting kit of claim 19, wherein said cavity has a generally rectangular configuration.

* * * * *

UNITED STATES PATENT AND TRADEMARK OFFICE
CERTIFICATE OF CORRECTION

PATENT NO. : 7,583,799 B2  Page 1 of 1
APPLICATION NO. : 11/260969
DATED : September 1, 2009
INVENTOR(S) : Powell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Fourteenth Day of September, 2010

David J. Kappos
*Director of the United States Patent and Trademark Office*